US 12,459,036 B2

(12) United States Patent
Mitteramskogler et al.

(10) Patent No.: US 12,459,036 B2
(45) Date of Patent: Nov. 4, 2025

(54) METHOD AND APPARATUS FOR ADDITIVE MANUFACTURING OF A COMPONENT

(71) Applicant: Incus GmbH, Vienna (AT)

(72) Inventors: Gerald Mitteramskogler, Vienna (AT); Christian Veigl, Vienna (AT)

(73) Assignee: Incus GmbH, Vienna (AT)

( * ) Notice: Subject to any disclaimer, the term of this patent is extended or adjusted under 35 U.S.C. 154(b) by 408 days.

(21) Appl. No.: 18/102,556

(22) Filed: Jan. 27, 2023

(65) Prior Publication Data

US 2023/0249251 A1    Aug. 10, 2023

(30) Foreign Application Priority Data

Feb. 7, 2022   (EP) ..................................... 22020036

(51) Int. Cl.
| | |
|---|---|
| *B22F 10/12* | (2021.01) |
| *B22F 10/20* | (2021.01) |
| *B22F 12/33* | (2021.01) |
| *B22F 12/67* | (2021.01) |
| *B33Y 10/00* | (2015.01) |
| *B33Y 30/00* | (2015.01) |

(52) U.S. Cl.
CPC ............. *B22F 10/12* (2021.01); *B22F 10/20* (2021.01); *B22F 12/33* (2021.01); *B22F 12/67* (2021.01); *B33Y 10/00* (2014.12); *B33Y 30/00* (2014.12)

(58) Field of Classification Search
CPC .......... B22F 10/12; B22F 10/20; B22F 12/67; B22F 12/33; B33Y 10/00; B33Y 30/00; B33Y 40/00
See application file for complete search history.

(56) References Cited

U.S. PATENT DOCUMENTS

2020/0130256 A1*   4/2020   Debora ..................... B32B 3/02

FOREIGN PATENT DOCUMENTS

EP              0450762 B1  *  1/1991

* cited by examiner

*Primary Examiner* — Ricardo D Morales
(74) *Attorney, Agent, or Firm* — Liang & Hennessey LLP; Brian Hennessey (57) ABSTRACT

In a method for additive manufacturing of at least one metallic or ceramic component, before at least one green part is built up layer by layer in a printing device, a support layer is applied to a surface of a printing support having recesses, so that the green part is built up layer by layer on the support layer, whereupon the green part lying on the printing support is removed from the printing device and unpolymerized material is removed from the green part, wherein removed material is collected in the recesses of the printing support or is drained off through the recesses, and wherein the cleaned green part is debinded and sintered.

11 Claims, 11 Drawing Sheets

METHOD AND APPARATUS FOR ADDITIVE MANUFACTURING OF A COMPONENT

CROSS-REFERENCE TO RELATED APPLICATIONS

The present application claims the priority benefit of European Patent Application No. 22020036.4, filed Feb. 7, 2022, entitled "METHOD AND APPARATUS FOR ADDITIVE MANUFACTURING OF A COMPONENT", which is incorporated by reference in its entirety.

BACKGROUND OF THE INVENTION

1. Field of the Invention

The invention relates to a method for additive manufacturing of at least one metallic or ceramic component, comprising:
- a) building up at least one green part layer by layer in a printing device from a plurality of green part layers, wherein the following steps are carried out for each green part layer:
  - applying a layer of polymerizable material mixed with ceramic or metal particles to form a material layer, and
  - location-selectively polymerizing the material layer to obtain a location-selectively polymerized green part layer, leaving an unpolymerized amount of material surrounding the green part layer,
  - so that the at least one green part is obtained in a material block of unpolymerized material,
- b) removing the at least one green part from the printing device,
- c) removing the unpolymerized material from the green part,
- d) debinding of the at least one green part, and
- e) sintering of the at least one green part to obtain the component.

The invention further relates to an apparatus for stereolithographic additive manufacturing of metallic or ceramic green parts, by means of which a method of the type mentioned above can be carried out.

2. Description of the Related Art

In stereolithographic additive manufacturing of metallic and ceramic components, the component is made by polymerizing a metal- or ceramic-filled photopolymerizable slurry layer by layer, separating the resulting green part from the surrounding unpolymerized material, and then debinding it in a furnace, which burns off the organic polymerized material. A metallic or ceramic body remains, which is finally sintered.

In conventional processes, it is necessary to manually transfer the green parts to the subsequent process steps after the layer-by-layer printing process. This includes removal of excess uncured material, fine cleaning, and proper placement of green parts for the debinding and sintering process. With any manual handling, there is a risk of deforming or destroying the green parts.

Furthermore, support structures are often required to ensure the final part geometry after sintering. These serve to counteract the distortions during sintering. The shape of the support structures depends on the component geometry and the orientation of the components during sintering.

Current additive manufacturing processes take different approaches to deal with these problems. One solution involves providing the components with support structures directly during the manufacturing process. This means that the support structures are connected to the surface of the components and have to be removed manually after sintering. Mechanical removal significantly affects the surface quality and limits the possibility of usable functional surfaces.

Another approach to solving this problem is to design the components in a way that is suitable for sintering. However, this leads to a drastic reduction in design freedom.

Furthermore, it is possible to print the support structures from the same material as the green parts as separate parts. During the debinding and sintering process, a ceramic powder layer is then applied between the green part and its support structures to prevent undesirable caking of the green part with the support structures. However, since both the green parts and the support structures shrink during the sintering process, the support structures cannot be reused for a new printing process for similar green parts.

SUMMARY OF THE INVENTION

The invention therefore aims at overcoming the above-mentioned disadvantages and at further improving a process of the kind mentioned above in such a way that the handling of the green parts is simplified and a support of the green parts during sintering is made possible.

In order to solve this problem, the invention essentially provides in a method of the kind mentioned at the beginning,
- that, before step a), a support layer is applied to a surface of a printing support having recesses, so that the green part is built up in layers on the support layer in step a),
- the at least one green part is removed from the printing device in step b) while lying on the printing support, and
- the unpolymerized material removed in step c) is collected in the recesses of the printing support or drained off through the recesses.

In contrast to previous processes, the green part is therefore not built up in layers on a flat build platform, but on a separate printing support which has recesses on its surface facing the green part to be built up and therefore provides a non-planar support surface. In order to nevertheless provide a flat base for the layered construction of the green part, a support layer is applied to the non-level support surface of the printing support in accordance with the invention. The printing support serves as a base for the layer-by-layer build-up of the green part and is also used as a base for the further process steps (post-processes). In particular, the green part remains on the printing support for removal from the printing device and for cleaning of the unpolymerized material, advantageously also during debinding and sintering. The fact that the green part remains on the printing support for the post-process steps means that the handling and positioning of the green part can be carried out, for example, by industrial robots or mechatronic systems whose grippers are able to grasp the printing support due to its dimensional stability, predefined size and position. The defined geometry and position of the printing support makes it possible to automate the additive manufacturing process.

The printing support preferably consists of a material that is not subject to shrinkage at the usual sintering temperatures of, for example, ≥1,000° C., so that it can be reused after the process chain has been completed. Further requirements on the material of the printing supports include physical (no change in hardness, color, etc.) and chemical stability, especially under sintering temperatures of e.g. ≥1,000° C.

The fact that the printing support has a support surface with recesses on the side facing the green part means that, during removal of the unpolymerized material, the printing support acts as a filter or sieve through which the unpolymerized material can run off or drip off while the green part is retained. For example, the recesses may be openings and/or they may include or communicate with channels or gutters.

The removal of the unpolymerized material from the green part is preferably done by heat, which reduces the viscosity of the unpolymerized material, which is usually highly viscous at room temperature, and increases the flowability. However, material removal may also include washing off the unpolymerized material using a washing medium or using a solvent.

In this context, a preferred embodiment of the invention provides that the support layer is made of the polymerizable material mixed with ceramic or metal particles. The support layer created on the printing support is thus made of the same material as the material layers applied to create the green part layers. The support layer is left unpolymerized in this case, so that it can be removed after the green part has been produced using the same process and at the same time as the unpolymerized material surrounding the green part. Due to the removal of the support layer, the green part comes to rest directly on the printing support and is preferably held there in a predetermined position and/or orientation.

However, the support layer can also be removed by means other than the unpolymerized material surrounding the green part, as long as it is ensured that the support layer is removed before step d) or e), preferably by allowing the material to flow off.

According to a preferred embodiment of the invention, it is provided that the recesses have surfaces that form a negative shape of the component or portions of the negative shape. The adaptation of the recesses in the printing support to the shape of the components to be produced means that the components or green parts can be accommodated in the printing support with a positive fit, so that a defined orientation of the structural or green parts is ensured during or after the process. This, in turn, facilitates visual inspection and quality assurance of the components by means of electronic image capture systems, which provides a further advantage for automation. Furthermore, the green parts or components in the form-fitted recesses are secured against displacement or falling out during handling of the printing support, e.g. by manipulators.

During the sintering process, the green parts shrink by a defined factor in the X, Y and Z directions, and there is a risk of undesirable deformation occurring during the shrinkage process. However, if during the sintering process the green parts lie in the recesses of the printing support which have the negative form of the respective desired component, undesirable deformation is prevented at least in the areas of the green part which lie against the negative form. The printing support thus serves as a sinter support structure during the sintering process.

In a preferred manner, the green parts enter the respective recess only by the effect of gravity. For this purpose, a separate recess is arranged below each green part. In order to achieve automatic falling of the green parts into their associated recesses, it is preferably provided that the support layer is applied to at least one of the recesses in a bridging manner on the material support, so that the green part comes into contact with the negative form as a result of the removal of the support layer by falling down.

According to a second aspect, the invention relates to an apparatus for stereolithographic additive manufacturing of metallic or ceramic green parts, in particular for carrying out the method according to the invention, comprising:
- a support for a material layer of a material to be polymerized, the surface of which forms a building plane,
- a build platform movable between a position flush with the building plane and a lowered position perpendicular to the building plane,
- a doctor blade movable parallel to the building plane for applying the material layer on the building plane, and
- an exposure unit for location-selective exposure of the material layer above the build platform or on a green part partially built up on the build platform,
- wherein a printing support is removably arranged on the build platform, which has a surface having recesses, onto which a support layer can be applied before the green part is built up.

BRIEF DESCRIPTION OF THE DRAWINGS

The invention is explained in more detail below with reference to schematic examples of embodiments shown in the drawing. Therein.

DETAILED DESCRIPTION

Figure 1:
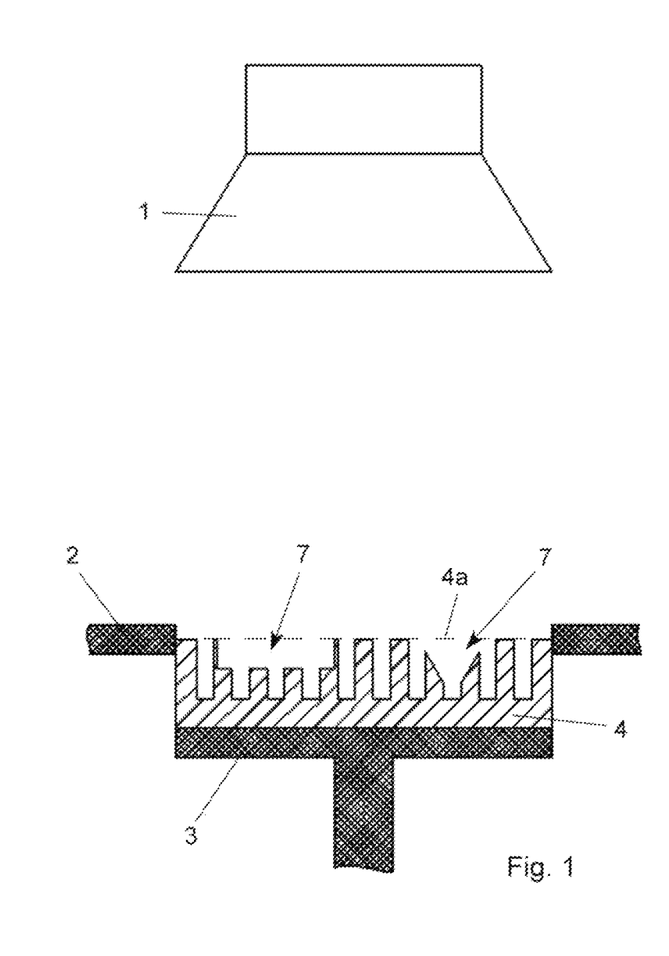
FIG. 1 is a sectional view of a printing support placed on the build platform in an initial position.

FIG. 1 shows a device according to the invention for additive manufacturing of metallic or ceramic components. The device comprises a plate-like base 2, the surface of which forms a building plane. In the area of an opening in the base 2, a build platform 3 is held by means of a lifting and lowering device, which is not shown, so that it can be moved in a perpendicular direction relative to the building plane between a position flush with the building plane and a lowered position. An exposure unit 1 is arranged above the build platform 3 for the location-selective exposure of a material layer. The exposure unit 1 can be designed as a DLP projector, for example. A printing support 4 is arranged on the build platform 3, which has a surface 4a onto which a support layer 5 can be applied before the green part is built up. The surface 4a of the printing support 4 has a plurality of recesses 7.

Figure 2:
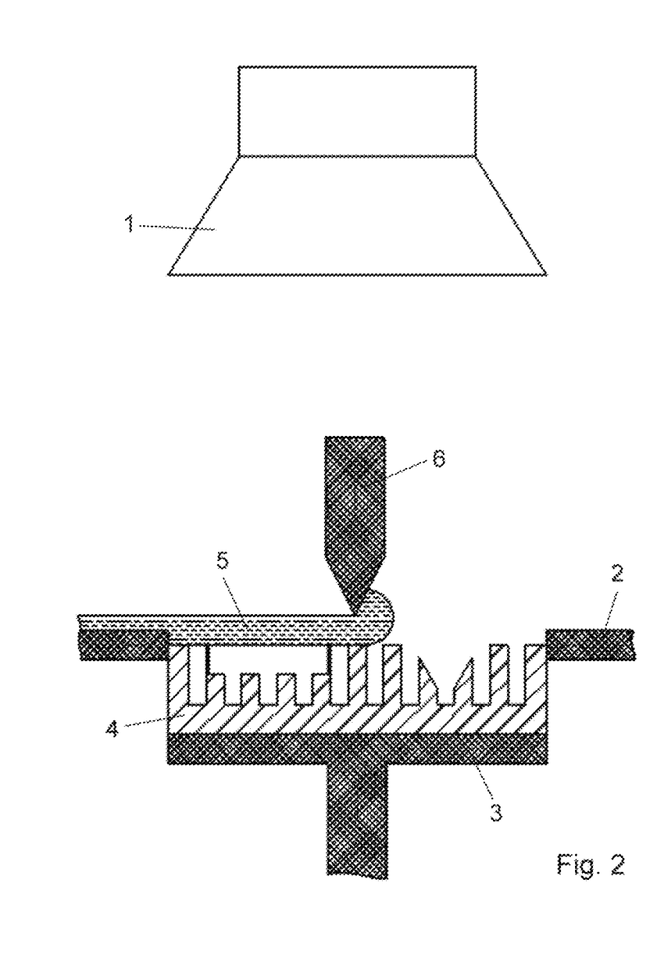
FIG. 2 shows the application of a support layer to the printing support.

A doctor blade 6, which can be moved parallel to the building plane, is provided for applying the support layer 5 to the printing support 4 (FIG. 2). This doctor blade scrapes material from an area of the device not shown onto the building plane.

Figure 3:
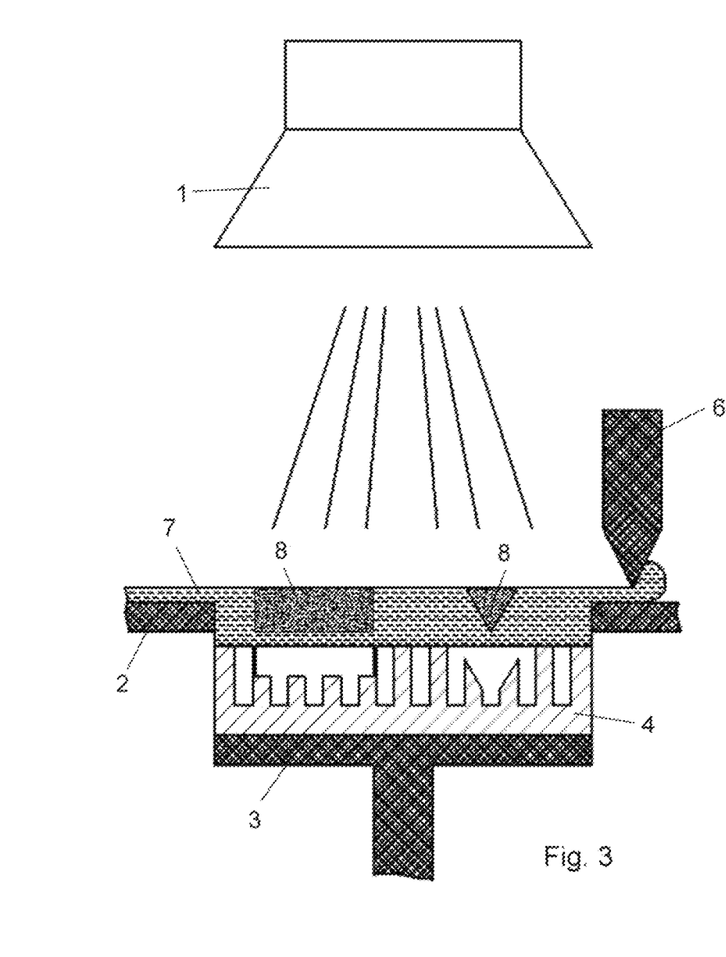
FIGS. 3 and 4 show the manufacturing process of the green parts.
Figure 4:
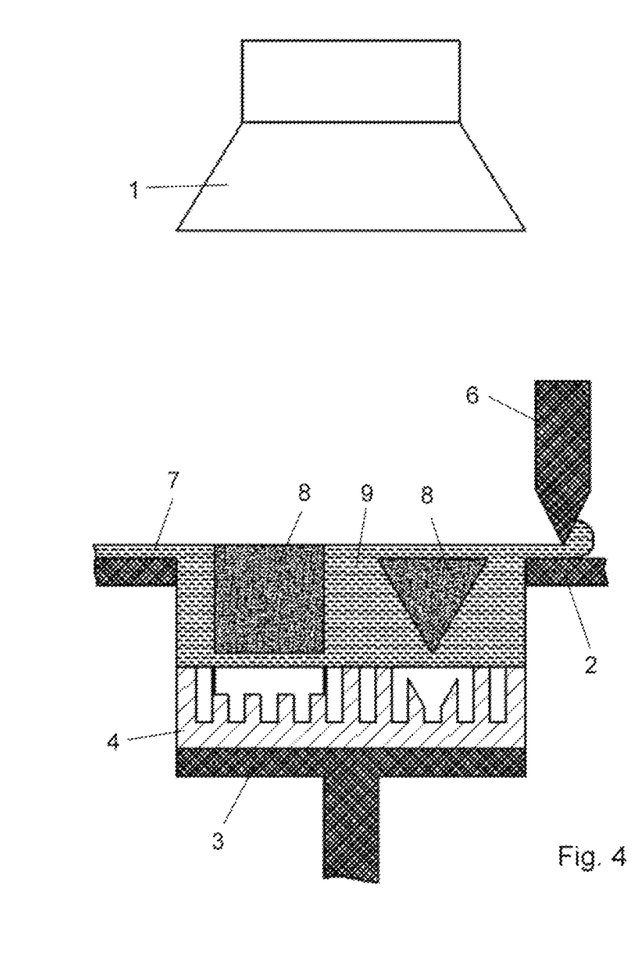

As shown with reference to FIGS. 3 and 4, the build-up of a green part 8 is carried out in layers, with a new material layer 7 being applied with the doctor blade 6 in each case, whereupon the material layer 7 is exposed with the exposure unit 1 in a location-selective manner in order to polymerize or solidify the polymerizable material layer 7 in those areas which are required for the build-up of the green part 8. After each step, the build platform 3 is lowered by an amount corresponding to the thickness of the material layer 7, so that a new material layer 7 can be applied to the surface of the partially built-up green part 8 in this way.

Figure 5:
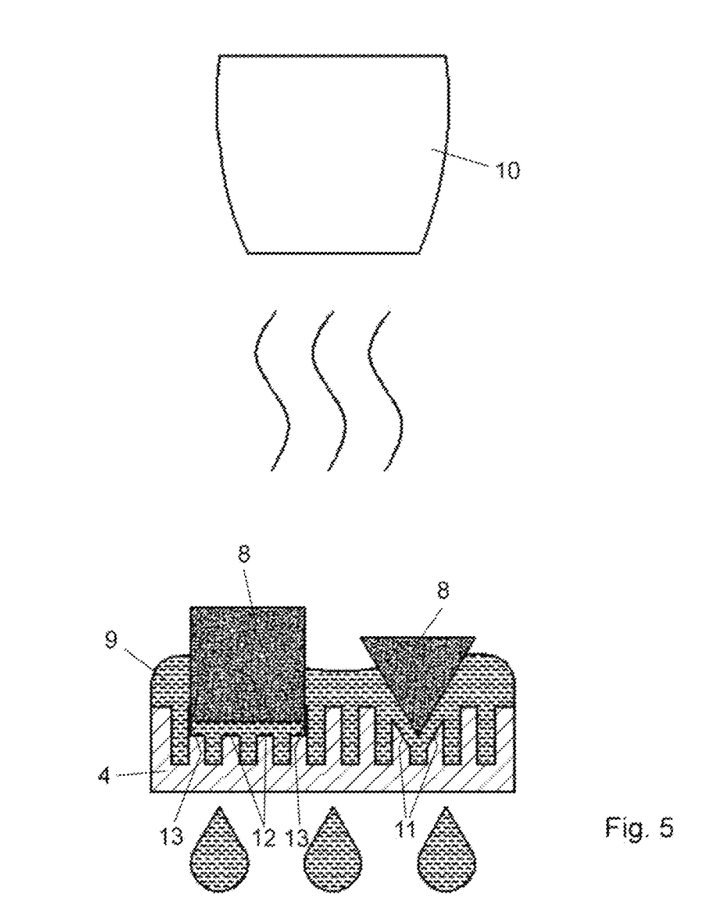
FIG. 5 shows the removed printing support together with the green parts embedded in the material block.

The described steps are repeated until the green parts 8 are completed (see FIG. 4). After manufacture, the green parts 8 are embedded in a material block 9 of unpolymerized material and can be exposed and cleaned by melting off the uncured material. This is shown in FIG. 5. For the purpose of cleaning, the printing support 4 with the green parts 8 arranged thereon is removed from the printing device, i.e. lifted off the build platform, and exposed to a heat source 10 which makes the unpolymerized material flowable so that the material can run off the green parts 8. During this coarse cleaning, the printing support 4 serves as a filter or sieve through which the draining material can run off or drip off.

Thereby, the support layer 5 also flows away, so that the green parts 8 sink into the respective recess of the printing support 4 below.

Figure 6:
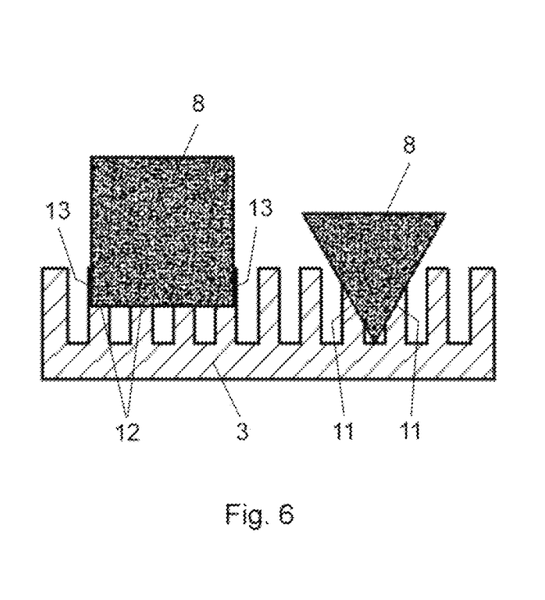
FIG. 6 shows the cleaning process of the green parts.

The recesses have surfaces which correspond to a negative shape of the respective green part or component 8, so that the green parts 8 are held positively and in a defined orientation at predefined positions on the printing support 4. The green part 8 with triangular cross-section shown in FIG. 6 rests on the sloping surfaces 11 and the green part 8 with square cross-section shown in FIG. 6 rests on the lower surfaces 12 and the side surfaces 13.

Figure 7:
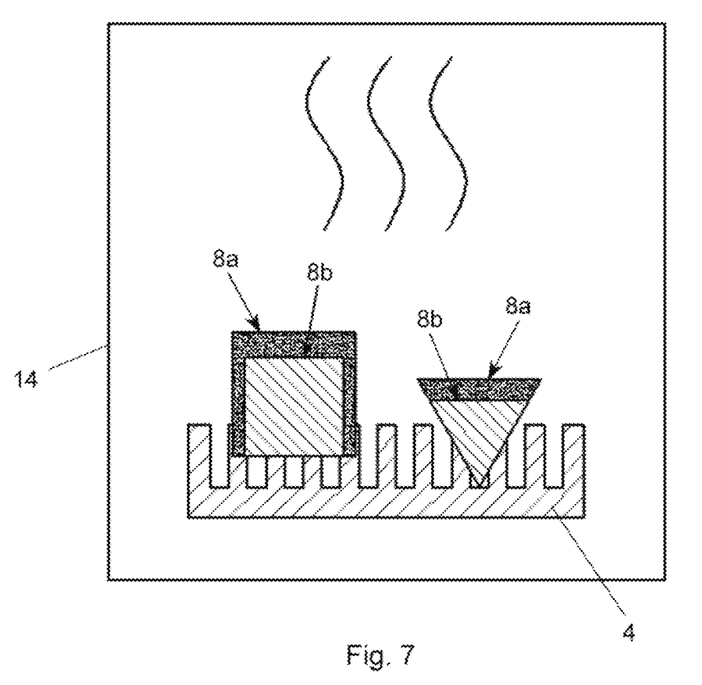
FIG. 7 shows the condition after completion of the cleaning process.

In the sintering process shown in FIG. 7, the green parts 8 shrink by a defined factor in the X, Y and Z directions in the sintering furnace 14. This is illustrated in FIG. 7 by the outline of the green part 8 marked 8a and the reduced outline of the finished component 8 marked 8b. During the sintering process, the printing support 4 serves as a negative mold. The shrinking components are received in the recesses of the printing support 4, with the flat contact against the negative mold preventing undesired deformation.

Figure 8:
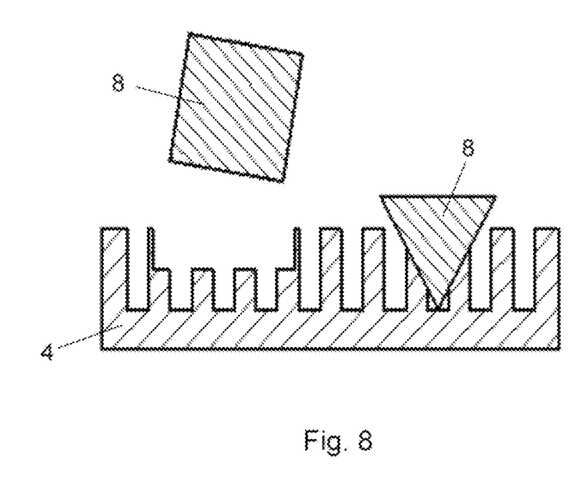
FIGS. 8 and 9 show the debinding and sintering process.

After the sintering process has been completed, the finished components 8 can be removed from the printing support 4, the printing support 4 cleaned and fed to the next manufacturing process (FIG. 8).

FIGS. 9 to 19 illustrate various embodiments of the recesses formed in the printing support 4.

Figure 9:
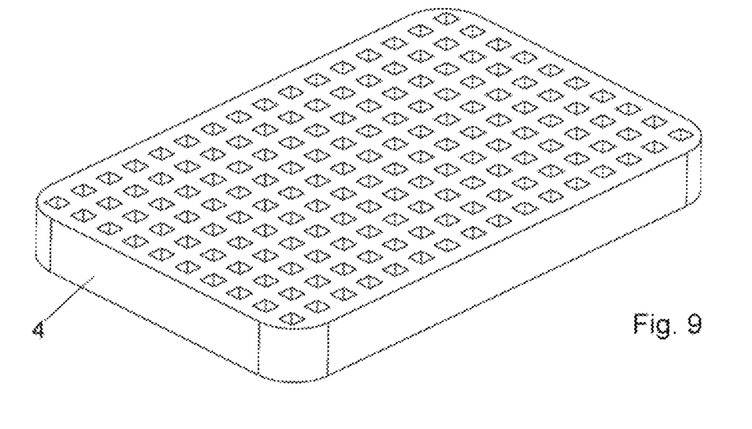
Figure 10:
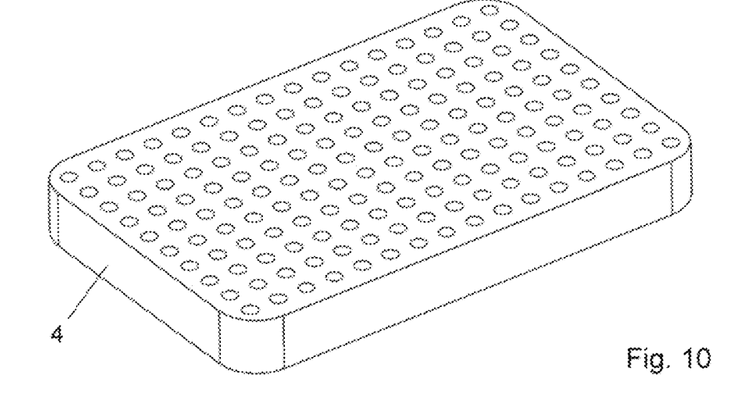
FIG. 10 is an isometric view of an embodiment of the printing support.
Figure 11:
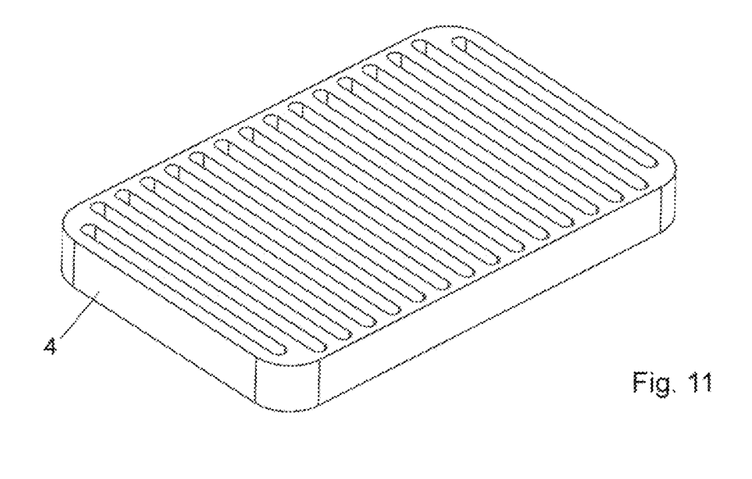
FIG. 11 is an isometric view of a modified embodiment of the printing support.
Figure 12:
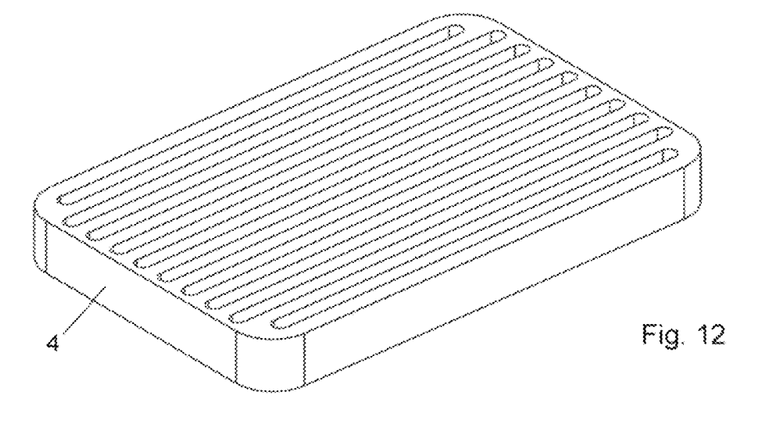
FIG. 12 is an isometric representation of a further modified embodiment of the printing support.
Figure 13:
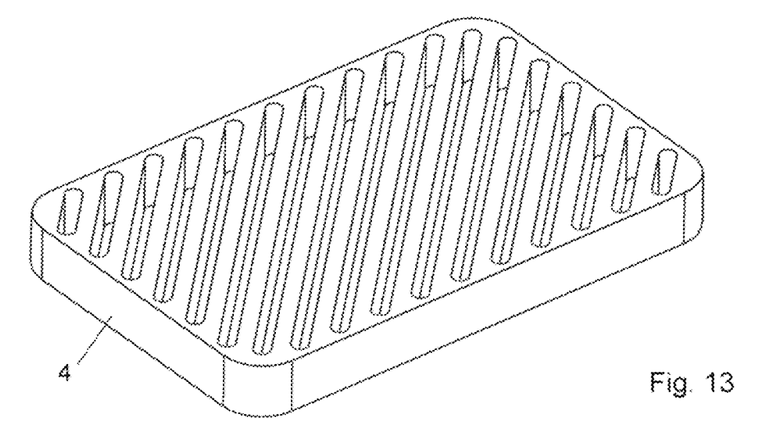
FIG. 13 is an isometric representation of a further modified embodiment of the printing support.
Figure 14:
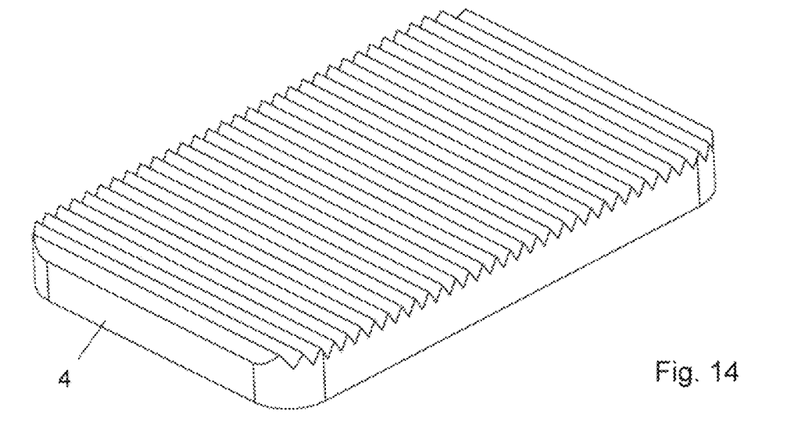
FIG. 14 is an isometric representation of a further modified embodiment of the printing support.
Figure 15:
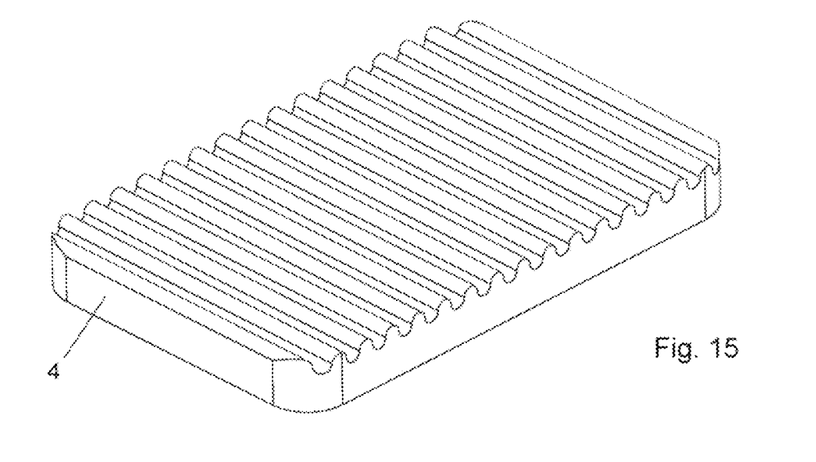
FIG. 15 is an isometric representation of a further modified embodiment of the printing support.
Figure 16:
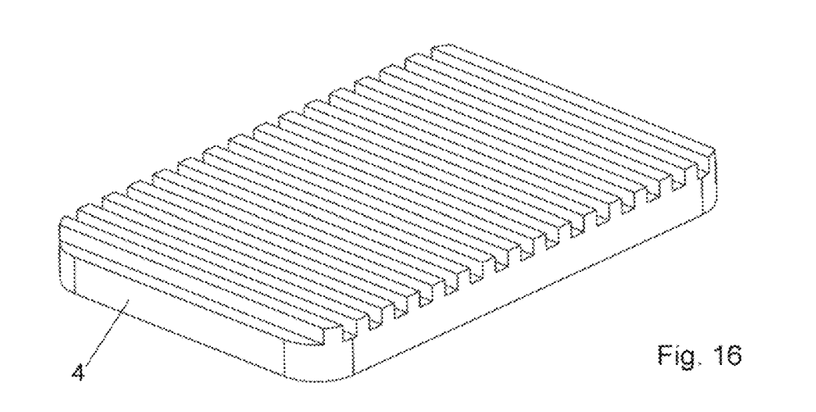
FIG. 16 is an isometric representation of a further modified embodiment of the printing support.
Figure 17:
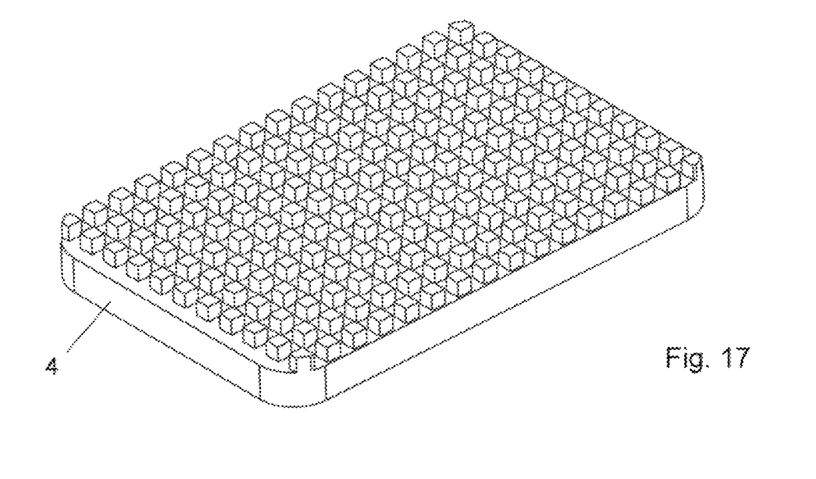
FIG. 17 is an isometric representation of a further modified embodiment of the printing support.
Figure 18:
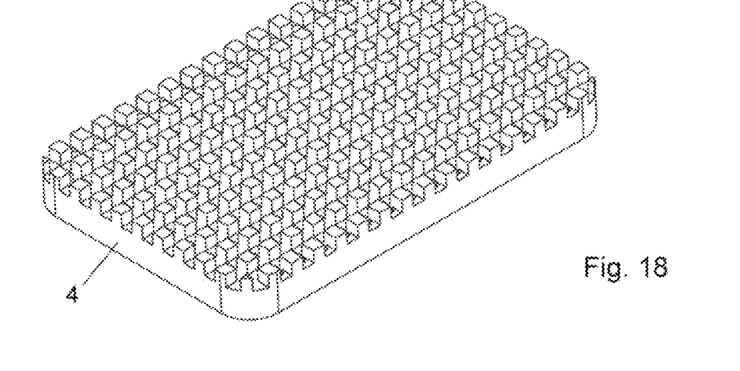
FIG. 18 is an isometric representation of a further modified embodiment of the printing support.
Figure 19:
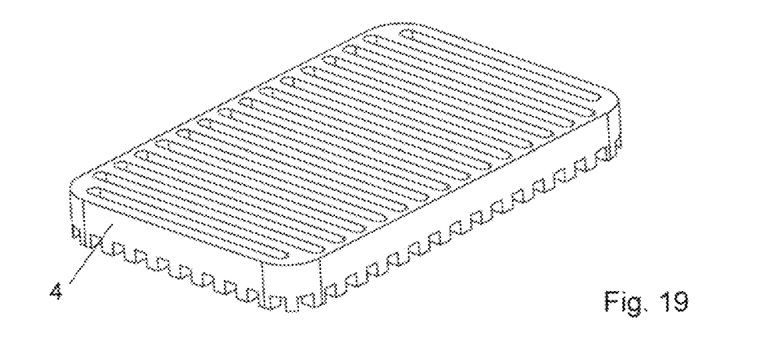
FIG. 19 is an isometric representation of a further modified embodiment of the printing support.

FIG. 9 shows the isometric representation of the printing support 4 with rectangular and square openings, respectively. FIG. 10 shows the isometric view of the printing support 4 with circular openings. FIG. 11 shows the isometric view of the printing support 4 with slit openings extending parallel to the short side. FIG. 12 shows the isometric view of the printing support 4 with slit openings extending parallel to the long side. FIG. 13 shows the isometric view of the printing support 4 with slanted, slotted openings. In FIG. 14, the printing support 4 is shown with cross-sectionally triangular shaped grooves running parallel to the short side. In the embodiment according to FIG. 15, the channels have a round cross-section. In the embodiment according to FIG. 16, the channels have a rectangular cross-section. FIG. 17 shows an isometric view of the printing support 4 with crossed grooves, rectangular in cross-section, running parallel to the short and long sides. FIG. 18 and FIG. 19 show an isometric view of the printing support 4 with a combination of crossed grooves that are rectangular in cross-section (top side, FIG. 18) and openings that are slotted parallel to the short side (bottom side, FIG. 19).

FIGS. 20 to 28 show that the recess 7 on the upper side of the printing support 4 is formed as a negative mold, which is adapted to the final shape of the component geometry. The figures each show the printing support 4 with negative mold and the component 8 as green part 8a and finished part 8b.

Figure 20:
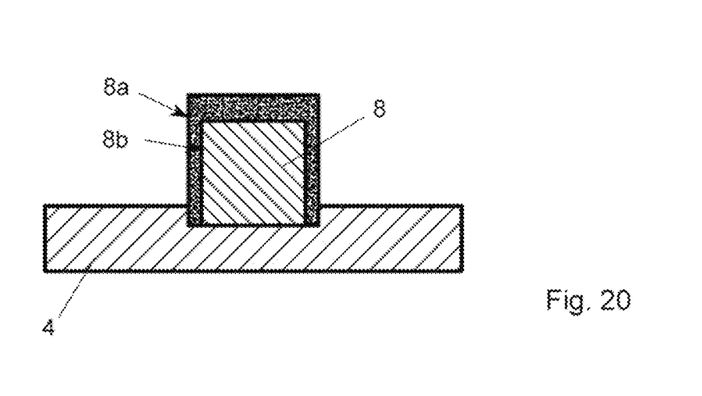
FIG. 20 is a sectional view of a rectangular component on the printing support.
Figure 21:
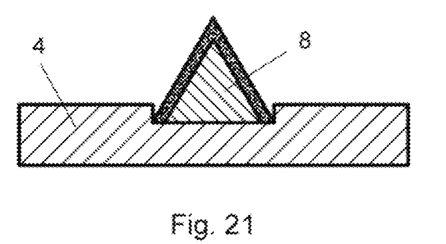
FIG. 21 is a sectional view of a triangular component on the printing support.
Figure 22:
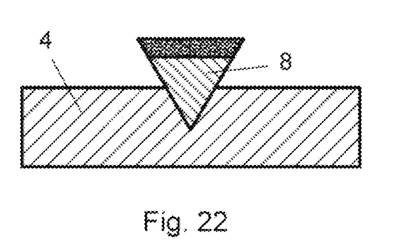
FIG. 22 is a sectional view of an inverted triangular component on the printing support.
Figure 23:
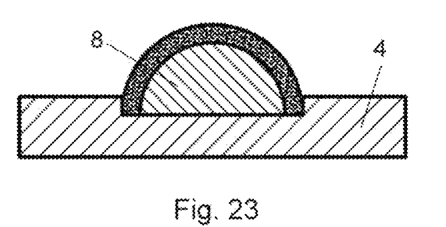
FIG. 23 is a sectional view of a semicircular component on the printing support.
Figure 24:
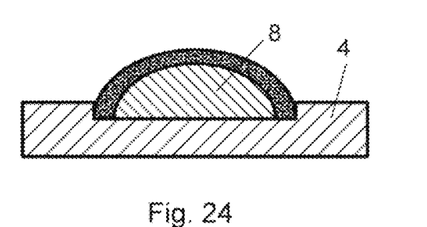
FIG. 24 is a sectional view of an ellipse-shaped component on the printing support.
Figure 25:
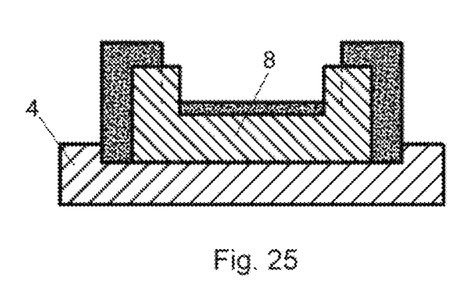
FIG. 25 is a sectional view of a U-shaped component on the printing support.
Figure 26:
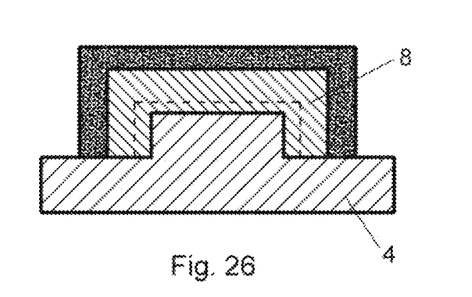
FIG. 26 is a sectional view of an inverted, U-shaped component on the printing support.
Figure 27:
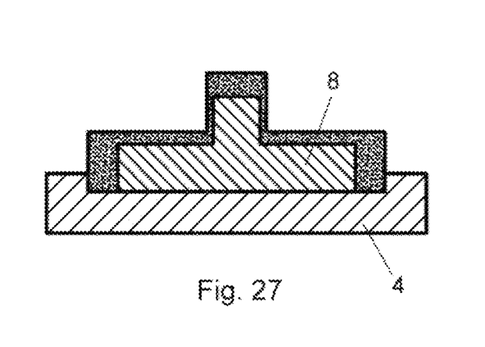
FIG. 27 is a sectional view of an inverted, T-shaped component on the printing support.
Figure 28:
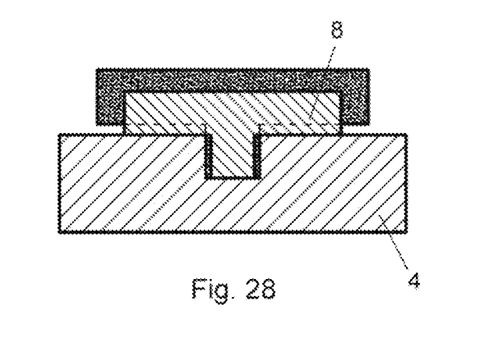
FIG. 28 is a sectional view of a T-shaped component on the printing support.
Figure 29:
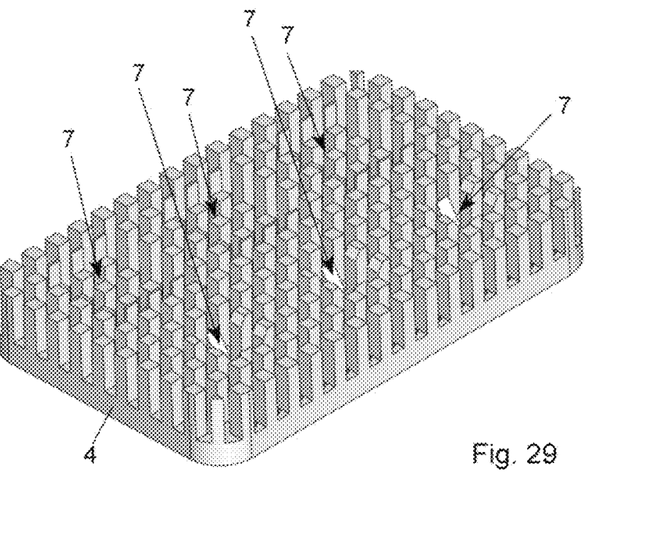
FIG. 29 is an isometric representation of the printing support with openings, channels and negative shapes adapted to the shape of the components.
Figure 30:
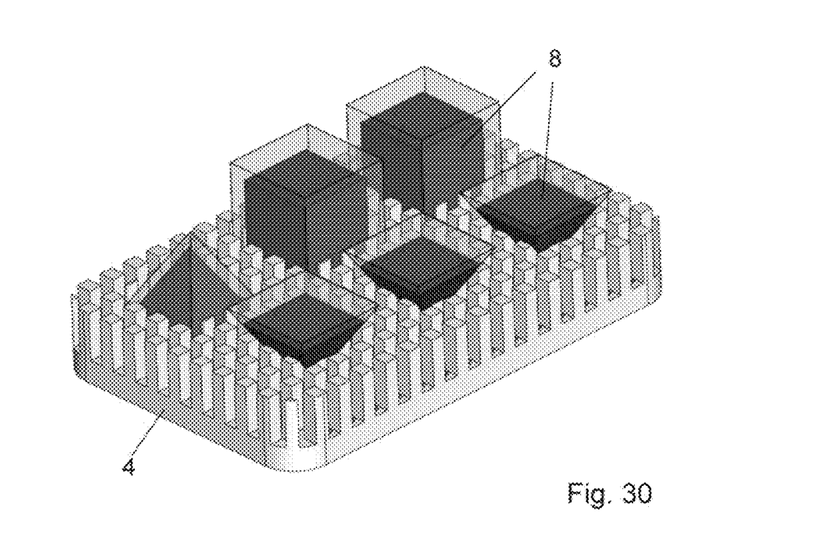
FIG. 30 is an isometric view of the printing support according to FIG. 29 with the green parts lying on it.
Figure 31:
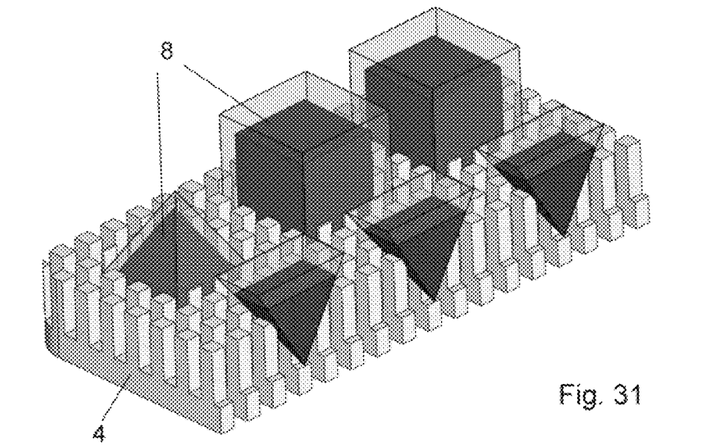
FIG. 31 is a cross-sectional, isometric view of the printing support according to FIG. 30.
Figure 32:
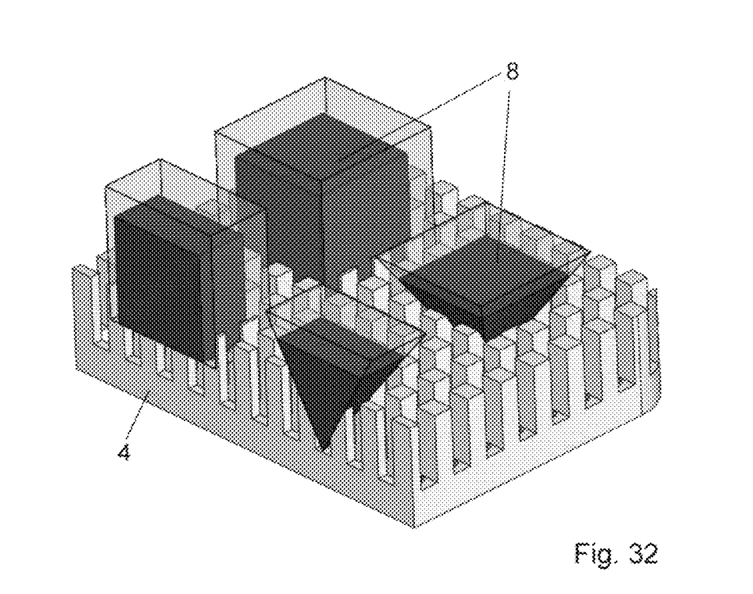
FIG. 32 is a longitudinally sectioned, isometric view of the printing support shown in FIG. 30.

FIG. 20 shows a recess of the printing support 4, which is adapted to the rectangular shape of the green part 8. FIGS. 21 to 28 show alternative shaping of the green part 8 and the corresponding negative mold in the printing support 4, namely a triangular shape (FIG. 21), an inverted triangular shape (FIG. 22), a shape with a semicircular cross-section (FIG. 23), a shape with a semi-elliptical cross-section (FIG. 24), a U-shape (FIG. 25), an inverted U-shape (FIG. 26), an inverted T-shape (FIG. 27), and a T-shape (FIG. 28).

FIGS. 29 to 32 show an embodiment of the printing support 7 in which a plurality of openings are provided in a grid-like arrangement, the openings communicating with transverse and longitudinal channels that allow the unpolymerized material to flow off. Furthermore, surfaces are provided which are set back relative to the surface 4a of the printing support 4 and form recesses 7 into which green parts or components 8 fit, as can be seen in particular in the sectional views according to FIGS. 31 and 32.

The invention claimed is:

1. A method for additive manufacturing of at least one metallic or ceramic component, comprising:
   a) building up at least one green part layer by layer in a printing device from a plurality of green part layers, wherein the following steps are carried out for each green part layer:
      applying a layer of polymerizable material mixed with ceramic or metal particles to form a material layer, and
      location-selectively polymerizing the material layer to obtain a location-selectively polymerized green part layer, leaving an unpolymerized amount of material surrounding the green part layer, so that the at least one green part is obtained in a material block of unpolymerized material;
   b) removing the at least one green part from the printing device;
   c) removing the unpolymerized material from the green part;
   d) debinding of the at least one green part; and
   e) sintering of the at least one green part to obtain the component;
   wherein
      before step a), applying a support layer to a surface of a printing support having recesses, so that the green part is built up in layers on the support layer in step a),
      removing the at least one green part from the printing device in step b) while lying on the printing support, and
      collecting the unpolymerized material removed in step c) in the recesses of the printing support or draining off said unpolymerized material through the recesses.

2. The method according to claim 1, wherein the support layer is made of the polymerizable material mixed with ceramic or metal particles.

3. The method according to claim 1, wherein the removal of the unpolymerized material in step c) comprises allowing the material to flow off.

4. The method according to claim 3, wherein the removal of the unpolymerized material in step c) comprising allowing the material to flow off results from an action of heat.

5. The method according to claim 1, wherein the recesses are formed as channels or troughs or are connected to channels or troughs.

6. The method according to claim 1, wherein the support layer is removed prior to step d) or e).

7. The method according to claim 6, wherein the support layer is removed by allowing the material to flow off.

8. The method according to claim 7, wherein the material is allowed to flow off as a result from an action of heat.

9. The method according to claim 1, wherein the recesses have surfaces that form a negative shape of the component or portions of the negative shape.

10. The method according to claim 9, wherein the green part comes into contact with the negative shape as a result of the removal of the support layer.

11. The method according to claim 1, wherein the support layer is applied to the printing support bridging at least one of the recesses.

* * * * *